United States Patent
Hakobyan et al.

(10) Patent No.: US 11,709,224 B2
(45) Date of Patent: Jul. 25, 2023

(54) MIMO RADAR SYSTEM

(71) Applicant: Robert Bosch GmbH, Stuttgart (DE)

(72) Inventors: Gor Hakobyan, Stuttgart (DE); Markus Gonser, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 332 days.

(21) Appl. No.: 17/170,430

(22) Filed: Feb. 8, 2021

(65) Prior Publication Data
US 2021/0270933 A1  Sep. 2, 2021

(30) Foreign Application Priority Data

Feb. 27, 2020  (DE) .......................... 102020202498.7

(51) Int. Cl.
*G01S 7/35* (2006.01)
*G01S 13/58* (2006.01)
*G01S 13/931* (2020.01)

(52) U.S. Cl.
CPC ............ *G01S 7/352* (2013.01); *G01S 13/583* (2013.01); *G01S 7/356* (2021.05); *G01S 13/931* (2013.01)

(58) Field of Classification Search
CPC ........ G01S 7/352; G01S 13/583; G01S 7/356; G01S 13/931
USPC ........................................................ 342/113
See application file for complete search history.

(56) References Cited

U.S. PATENT DOCUMENTS

| | | | | |
|---|---|---|---|---|
| 4,321,601 A * | 3/1982 | Richman | ............. | G01S 13/9092 342/25 C |
| 7,466,262 B2 * | 12/2008 | Stephens | .................. | G01S 3/72 342/146 |
| 7,714,782 B2 * | 5/2010 | Davis | ..................... | H01Q 21/22 342/99 |
| 8,436,763 B2 * | 5/2013 | Wintermantel | ....... | G01S 7/0233 342/70 |
| 9,274,250 B2 * | 3/2016 | Pasken | ..................... | G01W 1/10 |
| 9,285,504 B2 * | 3/2016 | Dannevik | ............... | G01W 1/00 |
| 9,519,056 B2 * | 12/2016 | Schroeder | ............... | G01P 5/001 |
| 9,810,774 B2 * | 11/2017 | Wittenberg | ......... | G01S 13/4463 |
| 10,754,025 B2 * | 8/2020 | Asghar | .................. | G01S 13/867 |
| 10,914,818 B2 * | 2/2021 | Schoor | .................. | G01S 13/426 |
| 11,428,796 B2 * | 8/2022 | Nam | ......................... | G01S 7/35 |
| 2007/0152871 A1 * | 7/2007 | Puglia | ..................... | G01S 13/34 342/134 |
| 2007/0208254 A1 * | 9/2007 | Johnson | .............. | G01S 15/8927 600/459 |
| 2012/0105267 A1 * | 5/2012 | DeLia | .................... | G06V 10/36 378/70 |
| 2015/0198705 A1 * | 7/2015 | Schoor | .................. | H01Q 25/00 342/147 |

(Continued)

FOREIGN PATENT DOCUMENTS

DE  102014212284 A1  12/2015
WO  2018076005 A1  4/2018

*Primary Examiner* — Nuzhat Pervin
(74) *Attorney, Agent, or Firm* — Norton Rose Fulbright US LLP; Gerard Messina

(57) ABSTRACT

A MIMO radar system including a transmitter array, and a receiver array, the antenna distances in one of the transmitter and receiver arrays being above the Nyquist limit for unambiguous angle measurements, but the antenna distances in the combination of the transmitter and receiver arrays being below this Nyquist limit. The system also includes a control and evaluation unit.

10 Claims, 5 Drawing Sheets

(56) References Cited

U.S. PATENT DOCUMENTS

| | | | | |
|---|---|---|---|---|
| 2015/0325913 A1* | 11/2015 | Vagman | ............... | H01Q 3/2605 |
| | | | | 342/368 |
| 2016/0131742 A1* | 5/2016 | Schoor | ................... | H01Q 3/247 |
| | | | | 342/128 |
| 2016/0131752 A1* | 5/2016 | Jansen | .................... | G01S 13/42 |
| | | | | 342/27 |
| 2017/0160380 A1* | 6/2017 | Searcy | ................. | G01S 7/2921 |
| 2017/0315221 A1* | 11/2017 | Cohen | ..................... | G01S 13/42 |
| 2019/0324136 A1* | 10/2019 | Amadjikpe | ............. | G01S 13/70 |
| 2020/0025906 A1* | 1/2020 | Kesaraju | ............... | G01S 13/589 |
| 2020/0049812 A1* | 2/2020 | Jansen | ............... | G01S 13/4454 |
| 2021/0173042 A1* | 6/2021 | Wu | .......................... | H04J 3/02 |
| 2021/0173069 A1* | 6/2021 | Wu | ....................... | G01S 13/345 |
| 2021/0405182 A1* | 12/2021 | Reynolds | .............. | G01S 13/887 |

\* cited by examiner

MIMO RADAR SYSTEM

CROSS REFERENCE

The present application claims the benefit under 35 U.S.C. § 119 of German Patent Application No. DE 102020202498.7 filed on Feb. 27, 2020, which is expressly incorporated herein by reference in its entirety.

FIELD

The present invention relates to a MIMO radar system, in particular, for motor vehicles.

BACKGROUND INFORMATION

Radar systems are used to an increasing extent in motor vehicles for detecting the vehicle surroundings and provide pieces of information about distances, relative velocities and direction angles of located objects, such as vehicles or obstacles, to one or to multiple safety functions or convenience functions, which relieve the driver during the driving of the motor vehicle or completely or partially replace the human driver. In these systems, MIMO (multiple input-multiple output) systems are increasingly used, in which multiple transceiver antennas are employed.

PCT Application No. WO 2018/076005 A1 mentions various types of MIMO radar systems: transmitters and/or receivers may be situated at different positions. By using codes that are orthogonal relative to one another, it is possible to generate virtual channels. A time multiplexing method, TDMA (Time Division Multiple Access), or a frequency multiplexing method, FDMA, (Frequency Division Multiple Access), may be used.

A MIMO radar measuring method is described in German Patent Application No. DE 10 2014 212 284 A1, in which a transmitted signal is ramp-shaped frequency modulated using a modulation pattern, in which sequences of ramps are assigned to different transmission switching states, which differ in the selection of antenna elements used for transmitting, and are temporally interleaved with one another. In turn, multiple sequences, which are temporally interleaved with one another, are assigned to one transmission switching state. Based on a peak position in a two-dimensional spectrum of a signal obtained for a sequence, values for a relative velocity of a radar target are determined, which are periodic with a predetermined velocity period. Phase relationships of spectral values in the spectra for the sequences of a transmission switching state are compared with phase relationships expected for respective periodic values of the relative velocity, and an estimated value for the relative velocity is selected based on the comparison result.

U.S. Patent Application Publication No. US 2017/0160380 A1 describes a MIMO radar system, in which multiple transmitting antennas transmit simultaneously. With the aid of pseudo-random phase modulation (PRPM), the phase of a signal directed to a respective transmitting antenna is randomly varied in order to obtain a degree of orthogonality between the simultaneously emitted and received signals.

Digital modulation methods including multiple carrier frequencies are known as OFDM (orthogonal frequency division multiplex) methods. A use of OFDM methods for radar systems is being increasingly studied. In an OFDM method, the frequency band is divided into multiple orthogonal sub-bands or sub-carriers (FDM, frequency division multiplexing), and OFDM symbols are transmitted sequentially in succession. The transmitting signal of an OFDM symbol consists, according to one modulation scheme of the symbol, of modulated sub-carrier signals orthogonal relative to one another, which are transmitted simultaneously within the OFDM symbol period.

A MIMO radar system has already been provided by the applicant, in which the repetition rate of the multiplex sequences is below the Nyquist limit for unambiguous Doppler measurement, so that the results of the relative velocity measurements, though in fact high resolution, are ambiguous. To resolve this ambiguity, the provided method capitalizes on the fact that the demultiplex methods, with which signals that are able to be unambiguously assigned to the individual transmitting antennas of the transmitter array are reconstructed again from the received signals, provide results of high quality only if the phase offset caused by the Doppler effect is appropriately corrected. For this purpose, however, the relative velocity of the relevant object must be known. The ambiguity is resolved by testing the various ambiguity hypotheses and then selecting that hypothesis, which yields the signal with the highest quality measure during demultiplexing.

SUMMARY

An object of the present invention is to provide a MIMO radar system including a simply constructed antenna array, in which relative velocities and location angles of radar objects are able to be determined in a short measuring time and with high accuracy and a large uniqueness range.

This object may be achieved according to example embodiments of the present invention. In accordance with an example embodiment of the present invention, a MIMO radar system is provided which includes:
  a transmitter array, which includes multiple transmitting antennas situated at a distance from one another in one angle resolution direction,
  a receiver array, which includes multiple receiving antennas situated at a distance from one another in the angle resolution direction,
  the antenna distances in one of the transmitter and receiver arrays being above the Nyquist limit for unambiguous angle measurements (spatial frequency below the Nyquist limit), but the antenna distances in the combination of the transmitter and receiver arrays being below this Nyquist limit (spatial frequency above the Nyquist limit), and including
  a control and evaluation unit, which is designed:
    to transmit transmission signals according to a periodic multiplex scheme via the transmitter array in each of multiple repeatedly implemented measuring cycles, the temporal sequence in the multiplex scheme being selected in such a way that unambiguous Doppler measurements are possible,
    to transform the signals received in one measuring cycle into an at least two-dimensional detection space, in which one dimension represents estimated values for the Doppler shifts and one other dimension represents estimated angles [for] the location angles of the located objects, the estimated values being ambiguous in at least one of these dimensions,
    to test ambiguity hypotheses for the estimated values, each test including a Doppler correction of the received signal on the basis of the respective ambiguity hypothesis, the creation of a mapping of the transmitting antennas on combinations of the Doppler-corrected received signals, and the determination of a quality measure for the ambiguity hypothesis, to select the ambiguity hypothesis having the highest quality measure for an unambiguous Doppler measurement, to carry out separate angle estimations on the basis of the transmitter array and of the receiver array, the angle estimation taking place on the basis of the transmitter array based on the mapping of the transmitting antennas on combinations of the Doppler-corrected received signals, which have been created on the basis of the selected ambiguity hypothesis, and to combine the results of the separate angle estimations to form an unambiguous angle measurement.

With the aid of the present invention, the previously provided method is expanded to the extent that an under-sampling, i.e., a sampling below the Nyquist limit takes place not only during the Doppler measurement, but also during the angle measurement. For this purpose, either the aperture of the transmitter array or the aperture of the receiver array is selected in such a way that a high angle separability is achieved, in return for which, however, ambiguous results are obtained. In contrast, the aperture of the respective other array is selected in such a way that the gaps between the individual antennas are filled to the point that an unambiguous result is obtained, although with lower angle resolution. When the results of the two angle measurements are then combined, a high-resolution and unambiguous measuring result is obtained, corresponding to a synthetic aperture, which may be generated using a comparatively small total number of transceiver antennas. As a result, a shared data compression in the dimensions "relative velocity" and "angle" is thus obtained.

However, the angle estimation on the basis of the transmitter array makes it necessary even here to reconstruct signals, which may be unambiguously assigned to the individual transmitting antennas, for which purpose a correction of the phase progression caused by the Doppler effect is again necessary. The ambiguities of the Doppler measurement on the one hand and of the angle measurement on the other hand may thus be jointly resolved, as a result of which an efficient and resource-preserving signal evaluation is enabled.

In accordance with an example embodiment of the present invention, a method is provided for distance estimation, Doppler estimation and angle estimation in a MIMO radar system is also described herewith, which method includes the following steps:

distance estimation, ambiguous Doppler estimation in a first stage, angle estimation in a first stage, either based on the receiver array, and joint Doppler estimation and angle estimation in a second stage for resolving the ambiguities and supplementing the angle information based on the transmitter array.

Advantageous embodiments and refinements of the present invention result from the disclosure herein.

In one specific embodiment of the present invention, the radar system is a FMCW or Chirp Sequence Radar, in which the frequency of the transmitted signals is modulated according to a sequence of steep frequency ramps, so-called chirps, the slope of which is so great that the Doppler effect on the ramp is negligible, and thus a pure propagation time measurement, i.e., a distance measurement, is carried out.

The relative velocity is then measured by evaluating the phase offset from ramp to ramp caused by the Doppler effect.

In accordance with the MIMO principle, suitable multiplex methods and demultiplex methods are required, with which the signals transmitted by the various transmitting antennas may be separated from one another. Code multiplex methods and time multiplex methods, in particular, are considered here.

In a code multiplex method, the signals, which are simultaneously transmitted by the transmitting antennas, are coded with orthogonal or quasi-orthogonal codes, which are established in a code matrix. The transmitted signals are then organized in a periodically repeating sequence of code blocks, each of which establishes a different distribution of the codes to the various transmitting antennas. The repetition rate with which the code blocks are transmitted then corresponds to the sampling rate for the Doppler measurement. If the inverse of this repetition rate, i.e., the period duration, exceeds a particular value (the Nyquist limit), the result of the Doppler measurement becomes ambiguous.

If a single code block contains, for example, nCl code instances, each of which predefines a different distribution of the codes to the transmitting antennas, the phases of the signals received in a single code block then form a vector including nCl components. In the case of a quadratic code matrix, nCl is equal to the number of the simultaneously transmitting antennas of the transmitter array. The received signal may then be decoded by multiplying the vector by the inverse of the code matrix. A prerequisite, however, is that the orthogonality of the coded signals is maintained during the reflection at the radar target or is at least able to be re-established. If the relative velocity of the radar target is different from zero, the Doppler effect results in a certain disruption of the orthogonality, with the result that the decoded signal for a given transmitting antenna also includes in each case a signal proportion that originates from other transmitting antennas.

Thus, in order to obtain measuring results having a high quality measure, the received signals must be corrected in accordance with the Doppler effect, which is successful only when specifically that value is selected from among the ambiguous values obtained in the measurement of the Doppler shift, which corresponds to the true relative velocity of the object. The ambiguities may therefore be resolved based on the quality measure. In the case of orthogonal codes, the quality of the angle estimation, for example, may be taken as a measure for the quality of the decoding.

In another specific embodiment of the present invention, a time multiplex method may be used instead of a code multiplex method. In that case, only one signal transmitting antenna of the transmitter array is active at any point in time, and a switch is made between the various transmitting antennas according to a periodic scheme. The order in which the individual antennas are activated is in this case generally not identical to the order in which the antennas are spatially situated in the transmitter array. A relative movement of the radar target therefore results in characteristic phase shifts between the signals received by various transmitting antennas, due to the time offset with which the signals have been transmitted, and these phase shifts are distinguishable from phase shifts that result via angle-dependent propagation time differences during signal emission at a particular angle relative to the normal angle of the transmitter array. In this case as well, the phase errors caused by the relative movement may be corrected by selecting from among the various ambiguity hypotheses for the Doppler shift and/or the location angle of the object the correct hypothesis or the correct pair of hypotheses and using these as a basis for the correction.

Specific embodiments of the present invention are also possible, which involve operating with a combination of code multiplex and time multiplex.

Similarly, specific embodiments are also possible, in which the code matrix is not quadratic. If the number of code instances is smaller than the number of transmitting antennas, an underdetermined equation system is then obtained during the decoding, which is solvable, however, with the aid of plausible additional assumptions (for example, regarding the number of simultaneously located radar targets). Conversely, an overdetermined equation system may be achieved if more code instances than transmitting antennas are present. In that case, a greater robustness of the ambiguity resolution, for example, with respect to signal noises or other interfering influences, is achieved.

In one specific embodiment of the present invention, the receiver array has a large, not completely filled aperture, so that the angle estimation on the basis of the receiver array is high resolution but ambiguous, whereas the transmitter array has a completely filled but smaller aperture, and thus enables unambiguous angle measurements having lower resolution. In another specific embodiment, however, the transmitter array may also have the large aperture and the receiver array the smaller aperture.

BRIEF DESCRIPTION OF THE DRAWINGS

Exemplary embodiments are explained in greater detail below with reference to the figures.

DETAILED DESCRIPTION OF EXAMPLE EMBODIMENTS

Figure 1:
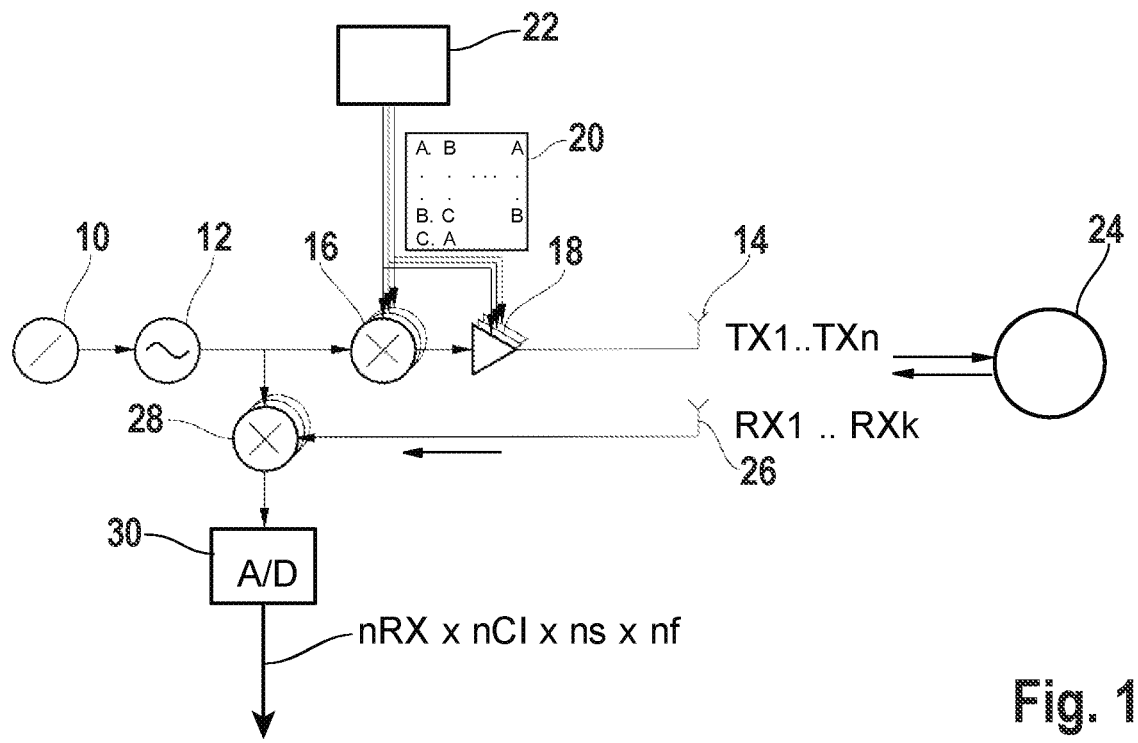
FIG. 1 schematically shows a representation of the analog portion of a MIMO radar system including a separate distance and velocity determination.

One exemplary embodiment of a Fast Chirp MIMO radar system is explained with reference to FIGS. 1 through 4 as an example of a FMCW-MIMO radar system, in which transmit signals are coded with the aid of phase modulation. FIG. 1 shows in a schematic and simplified manner the structure of the analog portion of the radar system.

A frequency modulation unit 10 controls a HF oscillator 12, which generates sequences of identical signals in the form of frequency ramps for multiple transmitting antennas 14. In each of the multiple transmission channels, a respective phase modulator 16, which is connected upstream from an amplifier 18, modulates the phases of the signals according to a respective code 20, which is generated by a code generator 22. The phase-modulated signal is emitted via one of transmitting antennas 14. The signal transmitted and reflected at an object 24 is received by multiple receiving antennas 26 and mixed in each receiver channel by a mixer 28 with a proportion of the non-phase-modulated signal of HF oscillator 12 and brought into a low-frequency range. An A/D conversion by an A/D converter 30 then takes place in the conventional manner.

Figure 2:
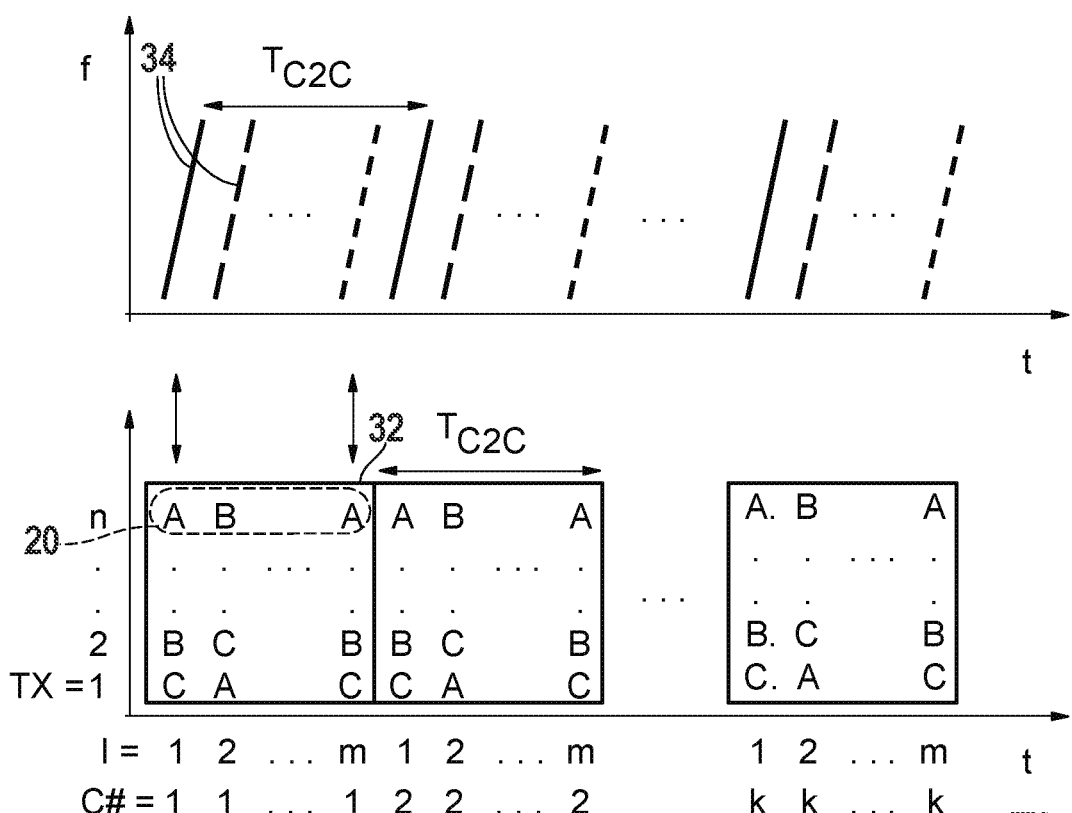
FIG. 2 shows diagrams of the frequency of FMCW transmit signals and of a modulation scheme of the transmit signals.

The frequency curve of transmitted signals and below this a scheme of code blocks 32, with which the transmitted signals are phase-modulated, are depicted in FIG. 2.

A "fast chirp" frequency modulation scheme including a sequence of relatively "fast" frequency ramps 34 is used in such a way that distance and velocity may be evaluated essentially separately from one another, for example, with the aid of a two-dimensional Fourier transform. In particular, the Doppler shift within a ramp may be ignored.

According to FIG. 2, codes 20 for individual transmitting antennas 14 are combined to form code blocks 32. Code block 32 assigns to each signal for an individual transmitting antenna a code value A, B, C, . . . of the relevant code 20. The individual code value defines a phase with which phase modulator 18 modulates the signal. For each code point in time, also referred to as code instance I, i.e., for each position within code 20, code block 32 thus defines for each of the transmitting antennas a relevant code value. The number of codes 20 of a code block 32 corresponds to the number of transmitting antennas that transmit simultaneously. In the sequence of code instances I where I=1, . . . , m, the phase modulation runs through the code values of the relevant code for each transmitting antenna. As shown in FIG. 2, code blocks 32 are identically repeated, at a repetition rate $1/T_{c2c}$, corresponding to a period duration $T_{c2c}$. Index C #=1 . . . k in FIG. 2 counts the repetitions of the code blocks, whereas an index TX=1 . . . n (n=m) numbers the transmitting antennas. Codes 20 of a code block 32 are orthogonal (preferably perfectly orthogonal or alternatively quasi-orthogonal, i.e., small cross correlations between the codes) relative to one another. Thus, the signals of the individual transmitting antennas are coded by the codes; the transmitted signals are orthogonal relative to one another in order to enable a signal separation in the receiver channel.

Figure 3:
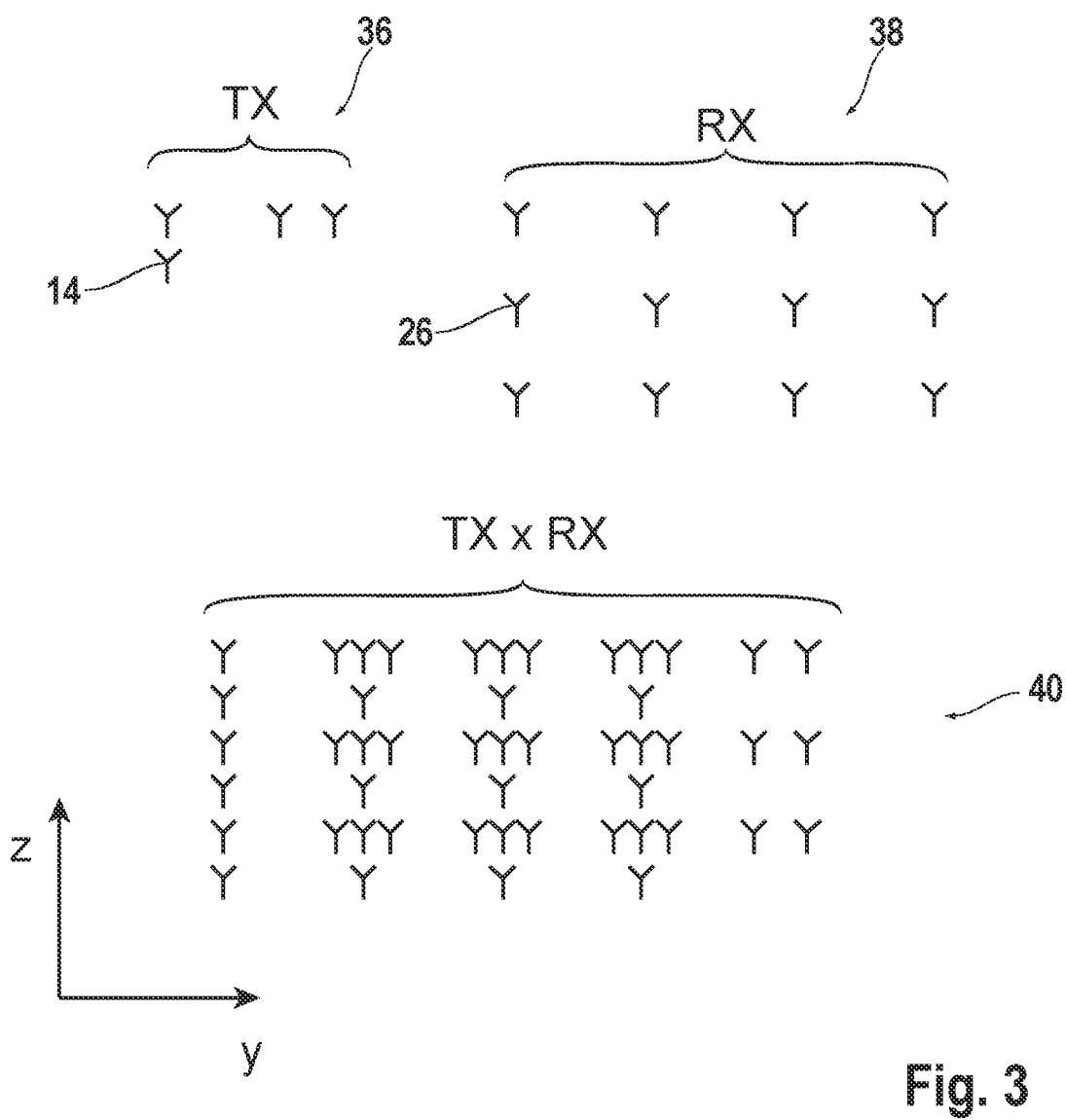
FIG. 3 shows a diagram of an antenna array of the radar system.

As shown in FIG. 3, transmitting antennas 14 form a transmitter array 36 and receiving antennas 26 form a receiver array 38. Both arrays in the example shown are two-dimensional, so that MIMO angle measurements are possible both in the azimuth and in elevation.

In receiver array 38, receiving antennas 26 are situated at uniform distances in an angle resolution direction y, for example, in the direction of the azimuth. The distances between the individual receiving antennas in this case are large enough that a large aperture and a correspondingly high angle resolution are achieved with just a few antennas. However, the distances from antenna to antenna in this case are greater than the half wavelength of the radar radiation, so that the Nyquist uniqueness criterion is not met.

Figure 4:
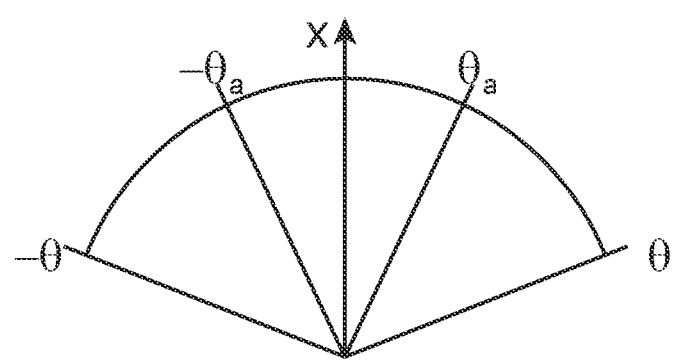
FIG. 4 shows a diagram of a location angle range of the radar system.

In FIG. 4, a field of view of the radar sensor is shown, which encloses angles from $-\theta$ to $+\theta$, as related to axis x, which is perpendicular to the plane of receiver array 38. The angle measurement results are unambiguous only when the location angle is within a significantly smaller interval from $-\theta_a$ to $+\theta_a$. If it is not possible to exclude larger location angles, then there are multiple angles for which the same phase relationships between the signals at the receiving antennas are obtained, so that the measurement is no longer unambiguous.

In the example shown in FIG. 3, receiving antennas 26 are also situated in elevation (in angle resolution direction z) at uniform distances, and in this direction as well, the antenna distances are large enough that a non-unambiguous undersampling takes place.

Transmitting antennas 14 of transmitter array 36 are situated in the azimuth at non-uniform distances, yet the distances are selected in such a way that an unambiguous angle measurement is possible. For this purpose, however, the aperture is significantly smaller than in the case of receiver array 38, so that the angle resolution is lower. In elevation as well, transmitter array 36 is designed with a smaller aperture for unambiguous angle measurements.

In FIG. 3, a synthetic array 40 is also shown, which is obtained when each of receiving antennas 26 is combined with each of transmitting antennas 14, so that the propagation time differences of the signals from the transmitting antennas to the object and from the object to the receiving antennas add up. Ultimately, it is the aperture of this virtual array 40, which determines the resolution capacity of the radar sensor. It is necessary, however, to separate from one another the signal proportions in the receive signal originating from the various transmitting antennas 14 so that the ambiguity of the receiver array may be resolved.

In the example shown in FIG. 3, the two angle resolution directions y and z are also decoupled from one another in receiver array 38, since for each y-position of the receiving antennas all z-positions are also occupied by receiving antennas. In contrast, transmitter array 36 is an example of a non-decoupled array, in which for some y-positions (the two right positions in FIG. 3) not all z-positions are occupied. In general, a decoupled array facilitates the data evaluation, whereas a non-decoupled array requires fewer antenna elements. The decision made between decoupled and non-decoupled arrays may be different for both the transmitting side as well as for the receiving side in accordance with the respective requirements.

The equidistant arrangement of the antenna elements (in the azimuth and/or in elevation) also facilitates the evaluation of the data, since they enable, for example, the use of a fast Fourier transform (FFT). On the other hand, the non-equidistant arrangement of the antennas, as in the case here of transmitting antennas 14, has the advantage that with a given aperture, the uniqueness angle range (FIG. 4) may be optimized.

In the radar system described herein, generally all combinations of equidistant and non-equidistant arrangement and decoupled or non-decoupled arrangement are conceivable. Similarly, specific embodiments are also possible, in which the transmitter array is designed for ambiguous high-resolution angle measurements, whereas the receiver array is designed for unambiguous angle measurements having a lower angle resolution.

One example of an evaluation unit for evaluating the received signals obtained with the antenna array according to FIG. 3 and in the multiplex scheme according to FIG. 2 is now explained with reference to FIG. 5.

The digital data provided from A/D converter 30 are each sampled over a complete measuring cycle. The number of all the (complex) signal values recorded in the measuring cycle is given by the product of the number nRX of receiving antennas 26 of receiver array 38, of the number nCl of code instances I, of the number ns of the repetitions of code blocks 32 within the measuring cycle, and of the number nf of the sampling points on an individual frequency ramp 34. In one processing stage 42, the data sampled over the measuring cycle are subjected to a four-dimensional Fourier transform (4D-FFT). The result is a four-dimensional spectrum including the dimensions: "Azimuth1," "Elevation1," "Doppler1" and "Distance." The dimension "Azimuth1" indicates the distribution of the complex amplitudes across the location angle range in the azimuth, based on the data of receiving antennas 26, which are situated in the same row in the azimuth direction. The dimension "Elevation1" correspondingly indicates the distribution across the elevation angle range, based on the data of receiving antennas 26, which are situated in the same column in the elevation direction. The dimension "Doppler1" indicates the Doppler spectrum obtained by the "slow" sampling at the repetition rate $1/T_{c2c}$ of the code blocks. It should be noted that the results in all three of the above-mentioned dimensions are ambiguous due to the respective undersampling. The dimension "Distance" indicates the distance spectrum, based on the "rapid" sampling on individual frequency ramps 34. The results in this dimension are unambiguous. A unique spectrum is obtained for each transmitted ramp.

The four-dimensional spectra are non-coherently integrated (addition of the absolute values of the complex amplitudes). The result is an amplitude distribution in a four-dimensional detection space 44. Each point in this four-dimensional space is assigned a particular amount of the amplitude sum, and each located object stands out in this space in the form of a peak (local maximum) with a particular distance, a particular, Doppler shift, a particular azimuth angle and a particular elevation angle, the latter three variables each being ambiguous in such a way that only one of multiple hypotheses relating to the relative velocity and similarly only one of multiple hypotheses relating to azimuth angle and elevation angle may be assigned to the object. In this detection space 44, the four-dimensional coordinates of the peaks found are searched, each of which represents a detection result. For each of these points, there are (before the non-coherent integration) nCl complex amplitudes, which form a vector including nCl components and are then further evaluated in order to resolve the remaining ambiguities.

For this purpose, various triplets of ambiguity hypotheses are tested in a test stage 46. Each ambiguity hypothesis includes a value for the Doppler shift, which is also considered in view of the ambiguous variable "Doppler1," one of the possible values for the azimuth angle, which is considered based on the ambiguous variable "Azimuth1" and one of the elevation angles, which is indicated by the ambiguous variable "Elevation1." The entirety of all these triplets therefore covers all possible combinations of Doppler shifts and angles. Each triplet contains, in particular, an assumed value for the Doppler shift and thus for the relative velocity. This value may now be used to correct the phases occurring in the signal vector in accordance with the relative velocity. As a result, the orthogonality of the codes in the code instances is re-established, so that if the hypothesis for the relative velocity is correct, a correct decoding is possible and a decoded signal vector is obtained, whose components indicate in each case the phase for the signal that originates from one of transmitting antennas 14. Based on the components of this vector that belong to transmitting antennas 14 situated in the azimuth direction, it is then possible to determine an unambiguous (but low-resolution) value for the azimuth angle, and correspondingly, it is possible based on the components that belong to the transmitting antennas situated in the elevation direction to determine an unambiguous value for the elevation angle.

If the assumed value for the relative velocity was false, then the decoding is not completely successful. In that case, the quality of the angle estimation in the azimuth and in the elevation will also be lower.

Based on these criteria, the ambiguities may now be resolved in a second detection stage 48. For this purpose, the phase-corrected and decoded signal vectors obtained in the test of the ambiguity hypotheses are combined, for example, coherently added, to form a three-dimensional spectrum. This spectrum has the dimensions "Doppler2," "Azimuth2," and "Elevation2," and the sharpest (and highest) peak in this spectrum indicates the true and unambiguous values for the relative velocity, the azimuth angle, and the elevation angle of the object. Multiple targets in this 3D space may also be resolved in the same manner.

The results "Doppler1," "Azimuth1," and "Elevation1" obtained in first detection stage 14 are high-resolution but ambiguous, whereas the results obtained in second detection stage 48 are low-resolution but unambiguous. These results may now be combined by selecting those values of the multiple high-resolution values for "Doppler1" as the final and unambiguous value for the relative velocity, which best agrees with "Doppler2." The values for the azimuth angle and the elevation angle may also be combined in a similar manner.

Since each located object may have a different relative velocity, test stage 46 and second detection stage 48 are carried out separately for each detection result obtained in detection space 44.

The architecture of the radar system shown in FIG. 1 also allows for an alternative operating mode, in which the transmit signals are transmitted not in code multiplex, but in time multiplex. In that case, code generator 22 controls individual amplifiers 18 in such a way that at each point in time only one single transmitting antenna is active and a switch between the transmitting antennas is made in a particular order. These switches are then repeated periodically-always in the same order—with a period duration that corresponds to period duration $T_{c2c}$ in FIG. 2. A coding of the transmit signals is then not necessary, since the transmit signals are already separated from one another by being transmitted in a time-delayed manner. A phase correction of the received signals is nevertheless necessary even in time multiplex in order to compensate for the time delay between the signals transmitted successively by transmitting antennas 14. Like the phase correction for re-establishing the orthogonality in code multiplex, the phase correction in this case is also based on ambiguity hypotheses for the relative velocity.

Similarly, an operating mode is also possible, in which code multiplex and time multiplex are combined with one another. In that case, transmitting antennas 14 are divided into groups, each of which transmits simultaneously and whose signals are coded with a correspondingly smaller code matrix.

Figure 5:
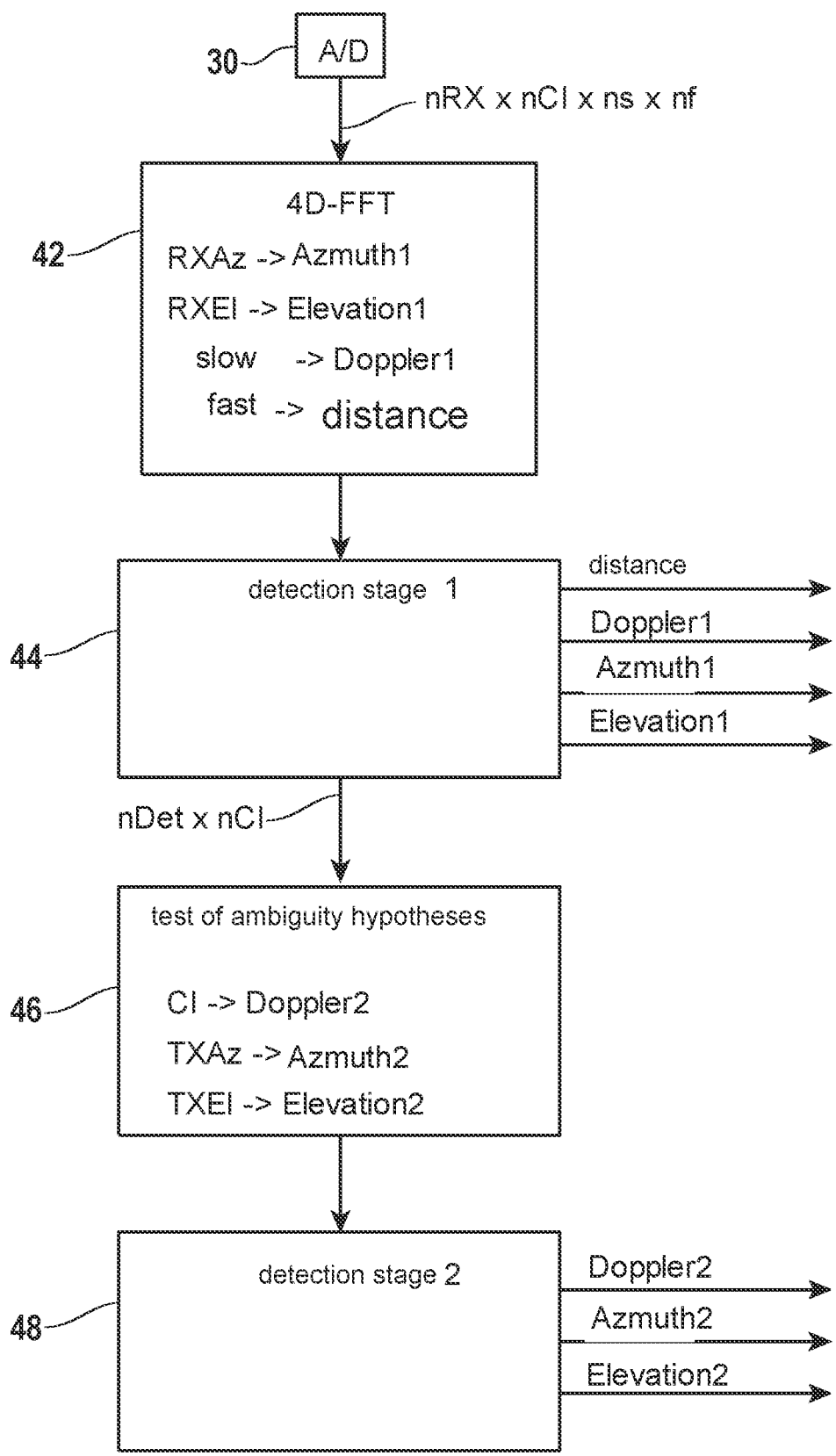
FIG. 5 shows a block diagram of a digital signal evaluation unit according to one specific embodiment of the present invention.

There are also various alternatives for the type of signal evaluation shown in FIG. 5.

Figure 6:
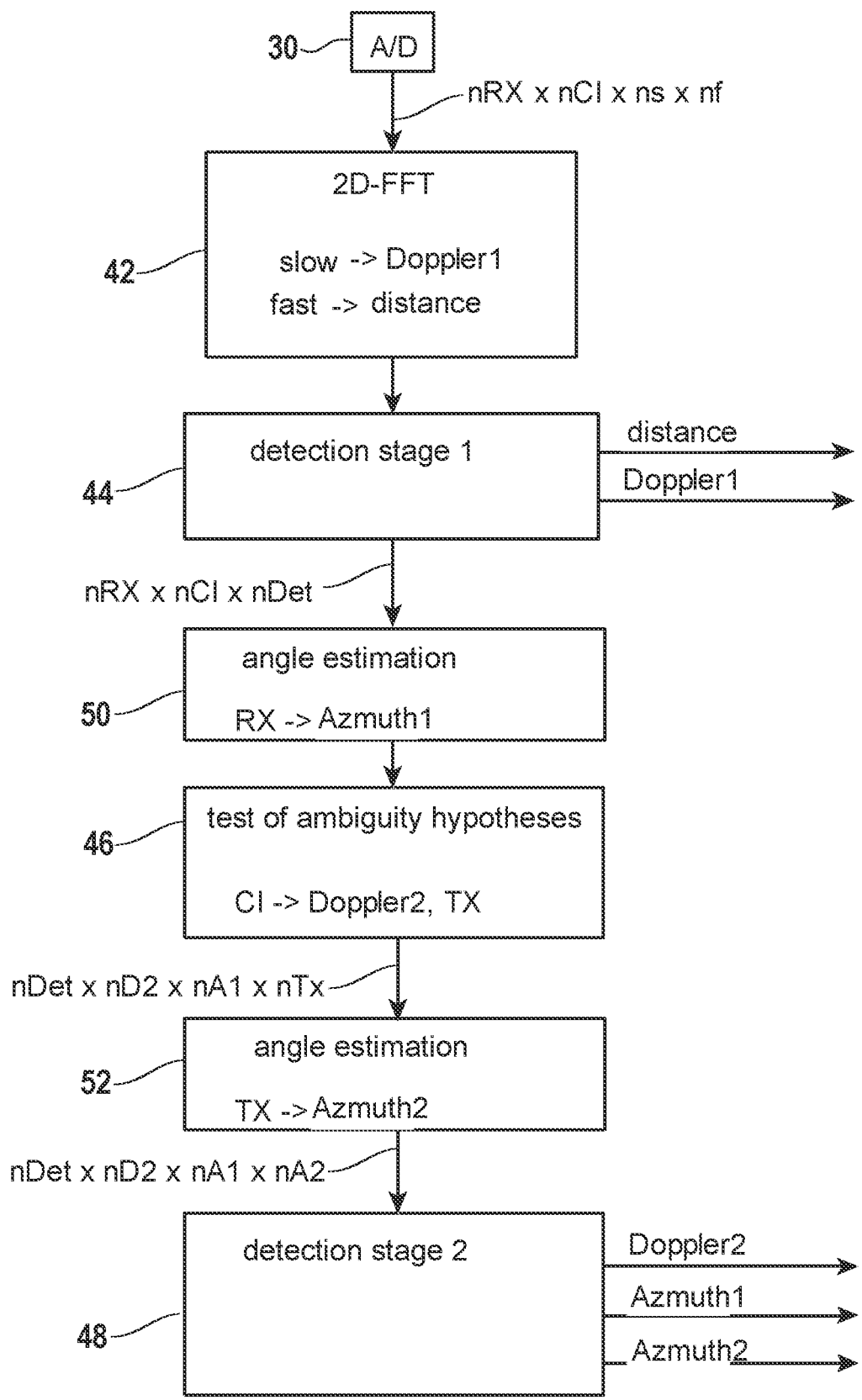
FIGS. 6 and 7 show block diagrams of digital signal evaluation units according to other specific embodiments of the present invention.

FIG. 6 shows an example in which the digital data sampled over a measuring cycle in processing stage 42 are initially only subjected to a two-dimensional Fourier transform, in the dimensions "Doppler1" and "Distance." Accordingly, the first detection stage provides only one value for the distance and various hypotheses for the variable "Doppler1" for each detected object. The complex amplitudes for the detected objects are fed to a first angle estimating stage 50, where an angle estimation takes place based on the phases of the values obtained for the various receiving antennas 26. In the example shown here, it is assumed for the sake of simplicity that the radar sensor is angle-resolving only in the azimuth. An expansion to angle estimations also in elevation is of course possible.

The ambiguity hypotheses are then tested in test stage 46, in each case including a phase correction for the assumed relative velocity and decoding of the phase-corrected signal vector. In this way, an unambiguous value "Doppler2" for the relative velocity and a set of signals TX assigned to the simultaneously active transmitting antennas 14 are obtained. Based on these signals, an angle estimation takes place in a second angle estimating stage 52 on the basis of transmitter array 36, as a result of which an unambiguous value "Azimuth2" for the azimuth angle is obtained. In second detection stage 48, a three-dimensional spectrum in the dimensions "Doppler2," "Azimuth1," and "Azimuth2" is thus obtained for each detection result of the first stage. The values for "Doppler1" and "Doppler2" as well as for "Azimuth1" and "Azimuth2" are then combined in the manner previously described.

Figure 7:
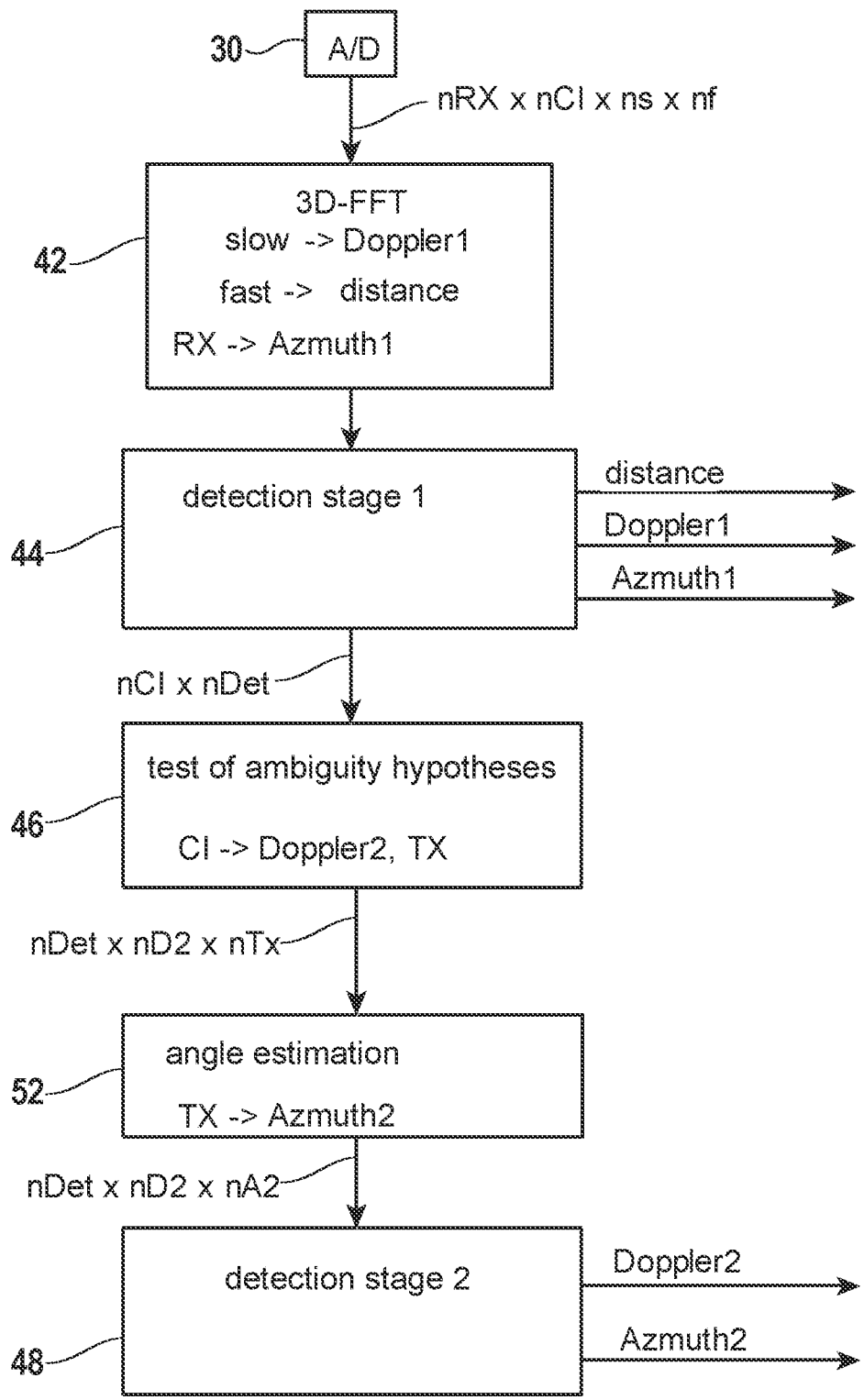

A further variant of the evaluation method is depicted in FIG. 7. In this method, a three-dimensional Fourier transform takes place in processing stage 42 in the dimensions "Doppler1," "Distance," and "Azimuth1," so that an unambiguous distance value and ambiguous values "Doppler1" and "Azimuth1" are obtained in detection space 44. A phase correction and a decoding then takes place in test stage 46 for each detection result and each Doppler hypothesis. An angle is then estimated at the decoded signals in angle estimating stage 52 on the basis of transmitter array 36, so that an unambiguous value "Azimuth2" for the azimuth angle is obtained. In second detection stage 48, the peaks in a two-dimensional spectrum in the dimensions "Doppler2" and "Azimuth2" are then searched for each detection result, after which the detection results obtained in detection stages 44 and 48 in the above-described manner are then combined.

In one radar system, in which unlike in FIG. 3, the transmitter array has a large unfilled aperture and the receiver array has the smaller aperture, the described evaluation methods may also be applied, however, with interchanging roles for the transmitter array and the receiver array.

What is claimed is:

1. A MIMO radar system, comprising:
    a transmitter array which includes multiple transmitting antennas situated at a distance from one another in an angle resolution direction;
    a receiver array which includes multiple receiving antennas situated at a distance from one another in the angle resolution direction, wherein antenna distances in one of the transmitter and receiver arrays is above a Nyquist limit for unambiguous angle measurements, but antenna distances in a combination of the transmitter and receiver arrays being below the Nyquist limit; and
    a control and evaluation unit configured to:
        transmit signals according to a periodic multiplex scheme via the transmitter array in each of multiple repeatedly implemented measuring cycles, a temporal sequence in the multiplex scheme being selected in such a way that unambiguous Doppler measurements are possible,
        transform signals received in one measuring cycle into an at least two-dimensional detection space, in which one dimension represents estimated values for Doppler shifts and one other dimension represents estimated values for location angles of located objects, the estimated values in at least one of the dimensions being ambiguous,
        test ambiguity hypotheses for the estimated values, each test including a Doppler correction of the received signals based on a respective ambiguity hypothesis, a creation of a mapping of the transmitting antennas on combinations of the Doppler-corrected received signals, and a determination of a quality measure for the respective ambiguity hypothesis;

select an ambiguity hypothesis of the ambiguity hypotheses having a highest quality measure for an unambiguous Doppler measurement;

carry out separate angle estimations based on the transmitter array and of the receiver array, the angle estimations taking place based on the transmitter array based on the mapping of the transmitting antennas on the combinations of the Doppler-corrected received signals, which were created on the basis of the selected ambiguity hypothesis; and combine results of the separate angle estimations to form an unambiguous angle measurement.

2. The radar system as recited in claim 1, wherein the multiplex scheme includes a code multiplex for at least some of the transmitting antennas.

3. The radar system as recited in claim 1, wherein the multiplex scheme includes a time multiplex for at least some of the transmitting antennas.

4. The radar system as recited in claim 1, wherein the transmit signals include sequences of frequency ramps, whose ramp slope for a distance measurement is designed according to a FMCW principle, and the Doppler measurements are based on relative phases of signals obtained in the periodic repetitions of the multiplex scheme.

5. The radar system as recited in claim 1, wherein the transmitter array is configured for unambiguous high-resolution angle measurements.

6. The radar system as recited in claim 1, wherein the receiver array is configured for unambiguous angle measurements and the transmitter array for ambiguous higher-resolution angle measurements.

7. The radar system as recited in claim 1, wherein the receiving antennas and/or the transmitting antennas are situated equidistantly in the angle resolution direction.

8. The radar system as recited in claim 1, wherein in the at least two-dimensional detection space, the estimated values for the Doppler shifts, and the estimated values for the location angles are ambiguous and the testing of the ambiguity hypotheses includes testing of various combinations of hypotheses for the Doppler shift and hypotheses for the location angle.

9. The radar system as recited in claim 1, wherein an angle estimation takes place based on the receiver array separately from the test of the ambiguity hypotheses.

10. The radar system as recited in claim 9, wherein the receiving antennas are situated equidistantly in the angle resolution direction and the angle estimation takes place based on the receiver array via a fast Fourier transform.

* * * * *